(12) United States Patent
Kestermann et al.

(10) Patent No.: US 8,154,235 B2
(45) Date of Patent: Apr. 10, 2012

(54) ELECTRIC DRIVE

(75) Inventors: Hermann Kestermann, Rheine (DE); Josef Upsing, Rheine (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 245 days.

(21) Appl. No.: 12/599,055

(22) PCT Filed: Apr. 23, 2008

(86) PCT No.: PCT/EP2008/003237
§ 371 (c)(1),
(2), (4) Date: Nov. 6, 2009

(87) PCT Pub. No.: WO2008/138454
PCT Pub. Date: Nov. 20, 2008

(65) Prior Publication Data
US 2010/0207397 A1     Aug. 19, 2010

(30) Foreign Application Priority Data
May 9, 2007   (DE) .................. 10 2007 021 632

(51) Int. Cl.
*H02P 9/02* (2006.01)
*H02P 9/04* (2006.01)
*H02H 7/08* (2006.01)

(52) U.S. Cl. ............... 318/400.21; 318/400.08; 318/471; 416/1; 290/44

(58) Field of Classification Search ............ 318/400.21, 318/400.08, 471, 767; 416/1; 290/44
See application file for complete search history.

(56) References Cited

U.S. PATENT DOCUMENTS

| | | | |
|---|---|---|---|
| 4,682,095 A | | 7/1987 | Shibata et al. |
| 2007/0216164 A1* | | 9/2007 | Rivas et al. .................... 290/44 |
| 2009/0167095 A1* | | 7/2009 | Rivas et al. .................... 307/87 |
| 2009/0278351 A1* | | 11/2009 | Rivas et al. .................... 290/44 |
| 2009/0278352 A1* | | 11/2009 | Rivas et al. .................... 290/44 |
| 2010/0143121 A1* | | 6/2010 | Haans et al. .................... 416/1 |
| 2010/0226157 A1* | | 9/2010 | Ohnishi et al. .............. 363/131 |
| 2010/0239411 A1* | | 9/2010 | Lane et al. .................... 415/18 |
| 2011/0057444 A1* | | 3/2011 | Dai et al. ...................... 290/44 |
| 2011/0137474 A1* | | 6/2011 | Larsen et al. ................ 700/287 |
| 2011/0142623 A1* | | 6/2011 | Nanukuttan et al. ............ 416/1 |
| 2011/0156389 A1* | | 6/2011 | Arlaban Gabeiras et al. .. 290/44 |
| 2011/0227343 A1* | | 9/2011 | Yasugi et al. .................. 290/44 |

FOREIGN PATENT DOCUMENTS

| | | |
|---|---|---|
| DE | 19945286 A1 | 4/2001 |
| DE | 10253811 A1 | 6/2004 |
| EP | 0771065 A1 | 5/1997 |
| EP | 1670134 A1 | 6/2006 |

* cited by examiner

*Primary Examiner* — Paul Ip
(74) *Attorney, Agent, or Firm* — Gifford, Krass, Sprinkle, Anderson & Citkowski, P.C.; Douglas L. Wathen (57) ABSTRACT

An electric drive has at least one electric motor and a power converter feeding electrical motor current thereto. A current desired-value emitter generates a reference signal. An additional circuit is coupled to the current desired-value emitter so as to receive the reference signal and generates a current desired-value signal. A current regulator is coupled to the additional circuit so as to receive the current desired-value signal. The current regulator generates a control signal to the power converter so as to regulate the motor current as a function of the current desired-value signal. The additional circuit has a first mode wherein the current desired-value signal corresponds to the reference signal and a second mode wherein the current desired-value signal is a pulsed signal.

13 Claims, 6 Drawing Sheets

ELECTRIC DRIVE

REFERENCE TO RELATED APPLICATIONS

This application is the United States national phase application of PCT/EP2008/003237, filed Apr. 23, 2008, which claims priority from German patent application Serial No. DE102007021632.9, filed May 9, 2007, the entire content of each application is incorporated herein by reference.

FIELD OF THE INVENTION

The invention relates to an electric drive having at least one electric motor to which an electrical motor current is or can be fed by means of a power converter. The driving has a current regulator by means of which the motor current is or can be regulated as a function of a current desired-value signal by action taken on the power converter. The drive has a current desired-value emitter which is coupled to the current regulator and by means of which a reference signal is or can be generated for the current regulator. The invention also relates to a wind power generator system having a drive of this kind, to a use of a drive of this kind and to a method of adjusting the position of at least one blade of the rotor of a wind power generator system.

BACKGROUND OF THE INVENTION

Wind power generator systems regulate the position of the rotor blades using converter-equipped drives acting as pitch-control drive systems. So that the maximum load carrying capacity of the converters is not exceeded, the actual current at any given time is monitored. The permitted limiting current of the converters is so designed that a dynamic peak current is permitted for a defined length of time and is then reduced to the rated current of the units. It is known that the current permitted under dynamic conditions is equal to twice the rated current of the given unit. Typical drives allow 1.5 to 2 times the rated current of the unit a usual value for the dynamic current.

The converters which are used for D.C. drives are typically four-quadrant converters having B6 thyristor bridges connected in parallel, but oriented in opposite directions to one another. The dynamic current typically is available for 6 seconds in the converter. However, a period of 6 seconds is only achieved if there is no pre-existing load whatever on the converter. A reduction then takes place to the continuous current or rated current which is set.

The value of the dynamic current and its duration are preset at fixed values, with the monitoring of the current being performed by means of a monitoring circuit. With certain pre-existing loads, it may happen that all that the converter will then permit is the rated current. Depending on the load torque, this may result in the required revolution speed not being reached, which may result in the drive stopping. Particularly if there are resistances in the mechanical transmission, it may thus happen that the drive stalls and that it is erroneously switched off by the master fault monitoring system.

SUMMARY OF THE INVENTION

The present invention improves an electric drive in such a way that it can be operated at comparatively high currents for a longer time.

The electric drive according to the invention, particularly for adjusting the position of at least one rotor blade of a wind power generator system, has at least one electric motor to which an electrical motor current is or can be fed by means of a power converter. The drive has a current regulator by means of which the motor current is or can be regulated as a function of a current desired-value signal by action taken on the power converter, and a desired-value emitter for current which is coupled to the current regulator and by means of which a reference signal is or can be generated for the current regulator. The current desired-value emitter is coupled to the current regulator via an intervening additional circuit. In a first mode, the reference signal or a signal corresponding to the reference signal can be fed to the current regulator as the current desired-value signal from the additional circuit. In a second mode, a pulsed signal is or can be generated and is or can be fed to the current regulator as the current desired-value signal from the additional circuit.

Because, by means of the additional circuit, a pulsed signal is or can be generated and is or can be fed to the current regulator as a current desired-value signal is possible for the electric motor to be supplied with a pulse of current in a second mode. This results in the rms value of the current flowing through the power converter being reduced, but in the electric motor nevertheless being able to put out a high torque for the duration of each pulse. In the pulsed mode, the power converter is thus able to be operated at a high current (in the form of pulses) for a longer time than in the unpulsed mode. In particular, it is easier for resistances in the mechanical transmission to be overcome by pulsed operation lasting for a certain length of time than it is by a torque which acts continuously (without being pulsed) and which is available for only a relatively short time. The signal height of the pulses is preferably sufficiently large in this case for 1.5 to 2 times the rated current to flow through the power converter during the pulses. Between the pulses the signal height of the pulsed signal is lower, and the rated current or a lower current thus flows through the power converter between the pulses. What is to be understood by rated current in this case is in particular the rated current of the power converter. However, the exact values for the signal heights of the pulsed signal during the pulses and between the pulses can be set to preferred figures. In particular, the temporal duration of the pulses and/or the duration of the time between the pulses can be set. These temporal durations and durations of time are preferably of a size such that the speed of the current regulation is sufficient for the pulsed signal to be followed.

The pulsed signal may for example be a square-wave signal or a sawtooth signal or a sinusoidal signal, etc. The pulsed signal is preferably a periodic signal whose frequency can be set.

The signal corresponding to the reference signal is preferably generated by means of the additional circuit or can be generated by means thereof. The current desired-value signal is generated or can be generated by means of the additional circuit both in the first mode and in the second mode. In the first mode the current desired-value signal is preferably generated as a copy of the reference signal and in the second mode the current desired-value signal is preferably generated as the pulsed signal.

In a refinement, the pulses in the pulsed signal form at least two groups of pulses which succeed one another at an interval of time which is greater than the interval of time between two successive pulses in the same group of pulses. By this means too it is possible to overcome any overloading of the power converter, because there is a period free of pulses between two successive groups of pulses. In this pulse-free period, the signal height of the current desired-value signal is preferably such that the rated current flows through the power converter.

What is more, the temperature of the power converter may be monitored by means of the additional circuit. For this purpose, the additional circuit is preferably coupled to a temperature sensor by means of which the temperature of the power converter is or can be measured. The signal height of the pulses in the pulsed signal is or can be varied, and in particular reduced, by means of the additional circuit if the measured temperature reaches or exceeds a preset maximum temperature. The purpose of this provision too is to protect the power converter against overloading. The temperature measurement can be made directly at the power converter or at a body, such as a heat sink, which is thermally coupled to the power converter.

The additional circuit is preferably able to monitor the reference signal in the first mode, which means that the additional circuit switches or can switch to the second mode if the reference signal or the magnitude thereof is equal to or greater than a preset maximum value for a preset period of time. In particular, the additional circuit may monitor the reference signal in the second mode too, meaning that the additional circuit switches or can switch to the first mode if the reference signal or the magnitude thereof drops below a preset threshold value which is equal to or smaller than the maximum value.

The current desired-value emitter is preferably part of a speed regulator which regulates or can regulate the motor speed particularly in the first mode, or it may be the speed regulator. The current desired-value emitter preferably forms a speed-correcting means for the speed regulator (though as an alternative the speed-correcting means may also be called a speed regulator). In this case the reference signal is dependent on a difference between a desired electric motor speed and an actual speed thereof. In particular, the reference signal is generated as a function of a difference between the desired speed for the electric motor and the actual speed. The electric drive thus preferably has speed regulation with downstream or secondary current control. The reference variable for current regulation may be supplied by the speed regulator or in other words by the speed-correcting means thereof. Hence it is easily possible for the invention to be incorporated in an existing electric drive by breaking the connection between the speed-correcting means or speed regulator and the current regulator and inserting the additional circuit between them.

The electric motor is preferably a D.C. electrical machine which is operated and/or switched in particular as a series-wound electrical machine.

The current regulator can act on the power converter to regulate the motor current or acts on the power converter to regulate the motor current. The power converter is therefore preferably a controllable power converter which is or can be controlled or regulated in particular by means of the current regulator. The power converter preferably comprises one or more thyristors on whose gate terminal or gate terminals the current controller acts or can act directly or indirectly.

The power converter is or can be supplied with multi-phase power, the multi-phase power preferably being two-phase power or three-phase power. The power converter may have at least one multi-phase thyristor bridge to which the multi-phase power is or can be applied. The multi-phase thyristor bridge is preferably a two-phase or three-phase thyristor bridge. In particular the power converter has two B6 thyristor bridges which are connected in parallel, but oriented in opposite directions to one another, and which are or can be supplied with three-phase power.

The current regulator and/or the current desired-value emitter may take a digital form. The current regulator is preferably an analogue regulator, which means that the reference signal and/or the current desired-value signal are also preferably analogue signals. The current desired-value emitter and/or the speed-correcting means are also preferably analogue circuits. The speed regulator is also an analogue regulator. The additional circuit by contrast preferably has a digital processor. So that the processor is able to take in and process or rather evaluate the analogue signals, the additional circuit preferably has at least one analogue-to-digital converter by means of which the reference signal can be read in and digitized, and at least one digital-to-analogue converter by means of which the current desired-value signal can be emitted. Alternatively, it is possible for the additional circuit to be implemented in analogue form.

The invention also relates to a wind power generator system having a support, a rotor which is mounted on the support to be able to turn about a rotor axis and which has a rotor hub, and at least one rotor blade fastened to the rotor hub whose position relative to the rotor hub is or can be adjusted by means of a pitch-control drive, the pitch-control drive having at least one drive according to the invention which may be refined in conformity with all the embodiments mentioned.

To allow rotor blade position adjustment, it is preferably mounted on the rotor hub to be rotatable about a blade axis and can be turned by means of the pitch-control drive about the blade axis, which extends obliquely or perpendicularly to the rotor axis.

The invention also relates to the use of an electric drive for adjusting the position of at least one rotor blade of a wind power generator system, the electric drive being a drive according to the invention which may be refined in conformity with all the embodiments mentioned.

The invention relates in addition to a method of adjusting the position of at least one rotor blade of a wind power generator system by means of at least one electric motor to which an electric motor current which is regulated as a function of a current desired-value signal is fed by means of a power converter, a reference signal being generated to which the current desired-value signal corresponds in a first mode. There is a also a pulsed signal, to which the current desired-value signal corresponds in a second mode, which is generated if the reference signal or the magnitude thereof exceeds a preset maximum value for a preset period of time.

A change is preferably made back to the first mode if the reference signal or the magnitude thereof drops below a preset threshold value which is equal to or smaller than the maximum value.

The speed of the electric motor is preferably regulated, in particular in the first mode. When this is done the reference signal is preferably dependent on the difference between a desired electric motor speed and its actual speed. In particular, the reference signal is generated as a function of the difference between the desired speed and the actual speed.

The temperature of the power converter is preferably measured, the signal height of the pulses in the pulsed signal being varied, and in particular reduced, if the temperature which is measured reaches or exceeds a preset maximum value for temperature.

The electric motor is in particular a D.C. electrical machine. Also the power converter preferably has a multi-phase current, and in particular a two-phase current or three-phase current, fed to it.

DETAILED DESCRIPTION OF THE INVENTION

Figure 1:
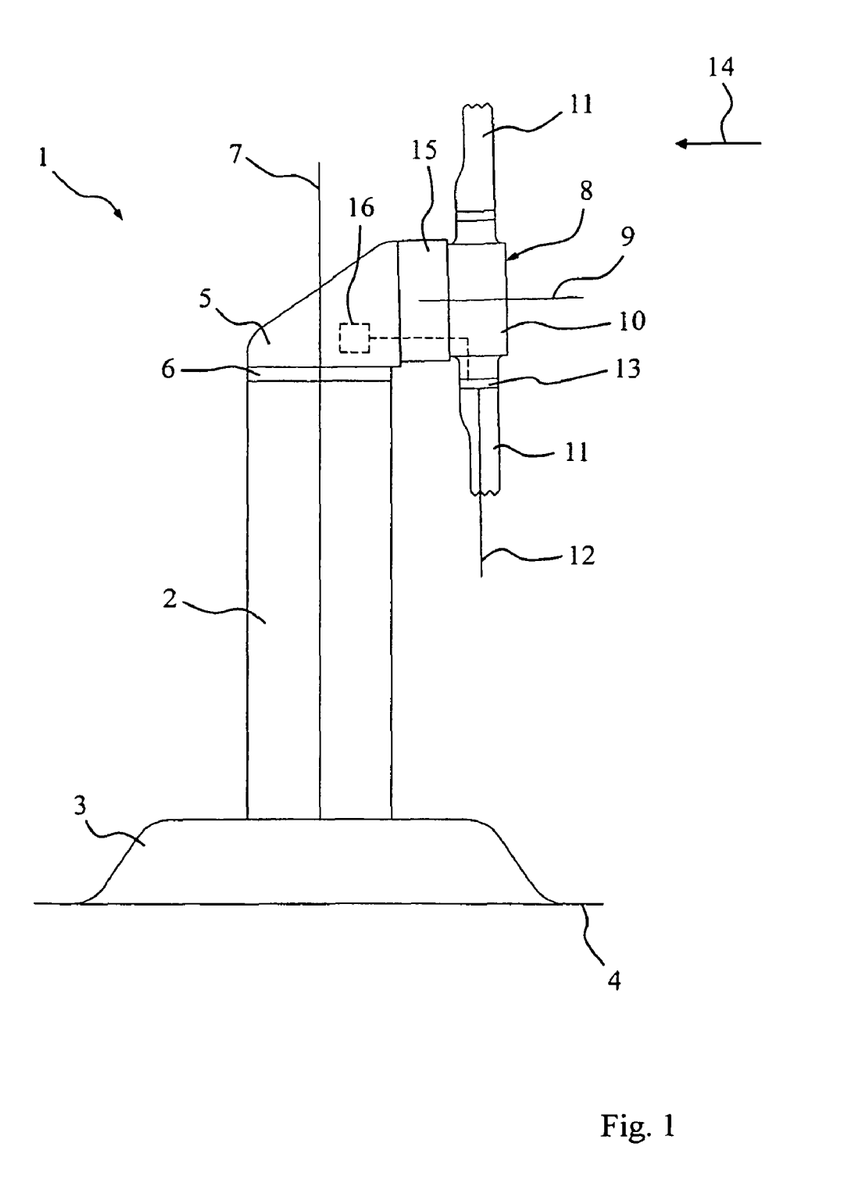
FIG. 1 is a schematic side view of a wind power generator system having an electric drive which conforms to one embodiment of the invention.

FIG. 1 provides a side view of a wind power generator system 1 which has a tower 2 which is anchored in the ground 4 by means of a foundation 3. At the end of the tower 2 remote from the foundation 3, a machinery support 5 is mounted on the tower 2 in such a way as to be rotatable about the longitudinal axis 7 of the tower 2 by means of an azimuth system 6. A rotor 8 is mounted on the machinery support 5 to rotate about a rotor axis 9. The rotor has a hub 10 and a plurality of rotor blades 11 which are each able to be turned relative to the rotor hub 10 about a blade axis 12. The blades axes 12 extend perpendicularly or obliquely to the rotor axis 9. Each of the rotor blades 11 may be turned about its blade axis 12 by means of a pitch-control drive 13. The rotor 8 can be turned about the rotor axis 9 by the wind 14 and can drive an electric generator 15. Also, each of the pitch-control drives 13 is electrically coupled to a system controller 16 which actuates or can actuate the pitch-control drives 13 to turn the rotor blades 11. Each of the pitch-control drives 13 has an electric drive 85 (see FIG. 2) which forms an embodiment of the invention, or is formed by a drive 85 of this kind.

Figure 2:
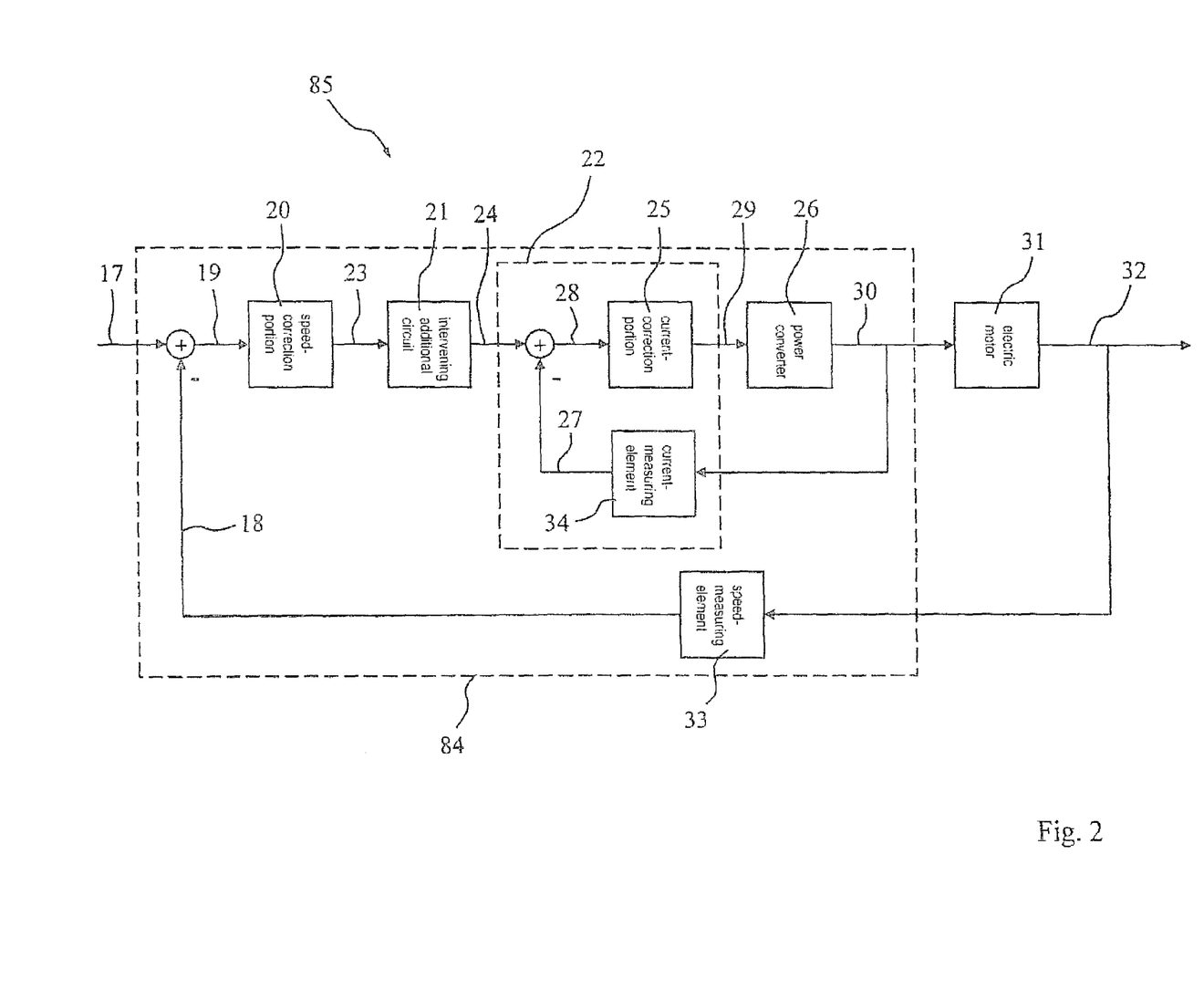
FIG. 2 is a schematic block diagram of the embodiment of the drive.

FIG. 2 provides a schematic block circuit diagram of one of the electric drives 85. The drive 85 is fed a desired-value speed signal 17 from which an actual-value speed signal 18 is subtracted. A speed difference signal 19 is fed to a speed-correcting portion 20. The speed-correcting portion 20 is electrically connected to a current regulator 22 via an intervening additional circuit 21. The speed-correcting portion 20 generates a reference signal 23 for the current regulator 22 as a function of the speed difference signal 19 and transmits it to the additional circuit 21. The additional circuit 21 transmits a current desired-value signal 24 to the current regulator 22.

The current regulator 22 has a current-correcting portion 25 which has a controllable power converter 26 connected downstream of it. A current actual-value signal 27 is subtracted from the current desired-value signal 24, and the current difference signal 28 is fed to the current-correcting portion 25. The current-correcting portion 25 generates a control signal 29 as a function of the current difference signal 28 and transmits it to the power converter 26. The power converter 26 supplies an electrical current 30 to an electric motor 31, which takes the form of a D.C. electrical machine in the present case, as a function of the control signal 29. The speed 32 of the electric motor 31 is measured by a speed-measuring element 33 which generates the speed actual-value signal 18, which represents the present speed 32 of the electrical motor 31. Also, the electric current 30 is measured by a current-measuring element 34 which generates and transmits the current actual-value signal 27 which represents the electric current (motor current) 30 which is flowing at the time through the electric motor 31.

In FIG. 2, reference numeral 84 identifies the speed regulator. As an alternative, it might however equally well be the speed-correcting portion 20 that was identified as the speed regulator. Also, in FIG. 2 reference numeral 22 identifies the current regulator. As an alternative, it might however equally well be the current-correcting portion 25 that was identified as the current regulator.

Figure 3:
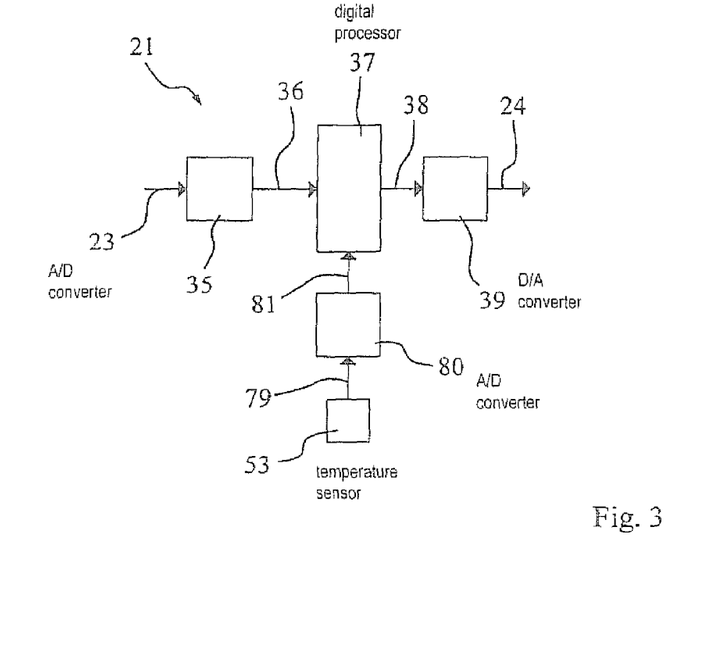
FIG. 3 is a schematic block diagram of the additional circuit shown in FIG. 2.

FIG. 3 provides a schematic block circuit diagram of the additional circuit 21, which has an analogue-to-digital converter 35 which converts the analogue reference signal 23 into a digital reference signal 36. The digital reference signal 36 is fed to a digital processor 37 which evaluates the digital reference signal 36 and generates and emits a digital current desired-value signal 38 as a function of its evaluation. The digital current desired-value signal 38 is fed to a digital-to-analogue converter 39 which converts the digital current desired-value signal 38 into the analogue current desired-value signal 24. Also provided is a temperature sensor 53 which is thermally coupled to the power converter 26. The temperature signal 79 emitted by the temperature sensor 53 represents the present temperature of the power converter 26 and is fed to an analogue-to-digital converter 80 which converts the analogue temperature signal 79 into a digital temperature signal 81 which is fed to the processor 37. The digital temperature signal 81 is evaluated by the processor 37 and if required is taken into account in the generation of the digital current desired-value signal 38. The temperature sensor 53 is preferably a KTY sensor.

Figure 4:
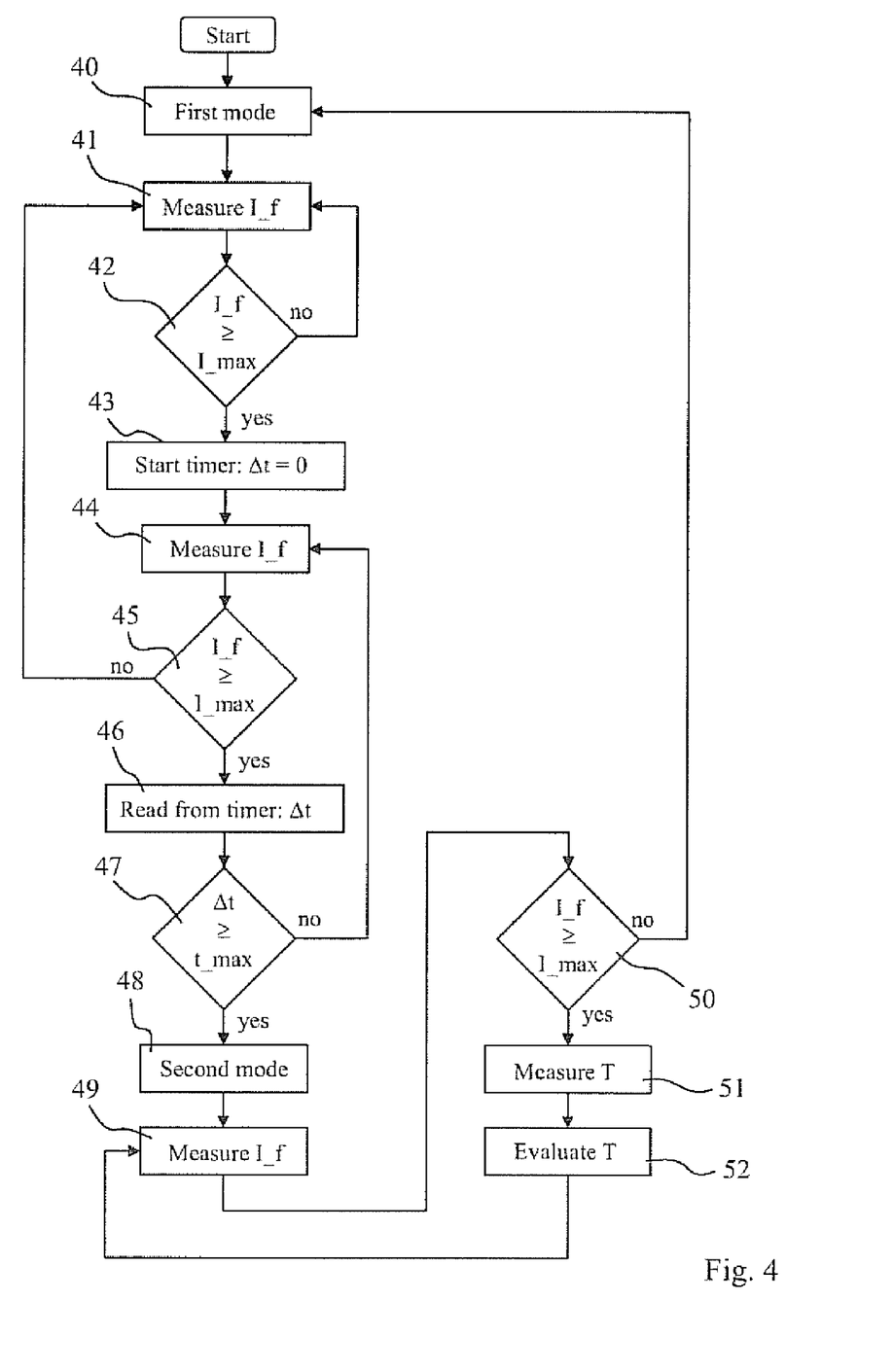
FIG. 4 is a flow chart for the additional circuit shown in FIG. 3.

The process which takes place in the additional circuit 21, or rather in the processor 37, will be described in what follows by reference to the flow chart which can be seen in FIG. 4. This flow chart merely indicates one of several possible implementations in this case and the flow chart in FIG. 4 should therefore not be construed as limiting.

First, in step 40, the additional circuit 21 is set to a first mode. In the first mode, the current desired-value signal (I_desired) 24 always corresponds to the reference signal (I_f) 23, and the transfer function of the additional circuit 21 is thus equal to "1" or approximately equal to "1". This being the case, the electric drive 85 forms an electric motor 31 which has a speed regulator 84 which is secondary to the current regulator 22.

In step 41, the reference signal I_f is determined and in step 42 it is checked whether the reference signal I_f is equal to or greater than a preset maximum value I_max. If it is not, a change is made back to step 41. If the result of the check in step 42 is positive, a timer is started in step 43. When interrogated, the timer supplies that period of time Δt which has elapsed between the time when the timer was started and the time of the interrogation. Consequently, what applies at the time when the timer is started is Δt=0. Following this, in step 44, the reference signal I_f is determined again and in step 45 is it checked whether the reference I_f is equal to or greater than the maximum value I_max. If it is not, a change is made back to step 41. If the result of the check in step 45 is positive, then the timer is interrogated in step 46 and, as a result of the interrogation, the period of time Δt which has elapsed from the time when the timer was started in step 43 to the time of the interrogation in step 46 is delivered.

In step 47 it is checked whether the period of time Δt supplied as a result of the interrogation is equal to or greater than a maximum time t_max. If it is not, a change is made back to step 44. If the result of the check in step 47 is positive, then the additional circuit 21 is set to a second mode in step 48. In the second mode, a pulsed signal I_puls (see FIG. 5) is generated by the additional circuit 21 and is emitted as the current desired-value signal, I_desired.

In step 49 the reference signal I_f is read in and in step 50 it is checked whether the reference signal I_f is equal to or greater than the maximum value I_max. If it is not, a change is made back to step 40 and the additional circuit 21 is set back to the first mode. If the result of the check in step 50 is positive, the temperature T of the converter 26 is determined in step 51. An evaluation of the temperature T which has been determined then follows in step 52, after which a change is made back to step 49.

The evaluation in step 52 of the temperature T which has been determined may comprise in particular a reduction in the signal height I_dyn (see FIG. 5) of the pulses in the pulsed signal I_puls if the temperature T which has been determined reaches or exceeds a preset maximum temperature T_max.

Figure 5:
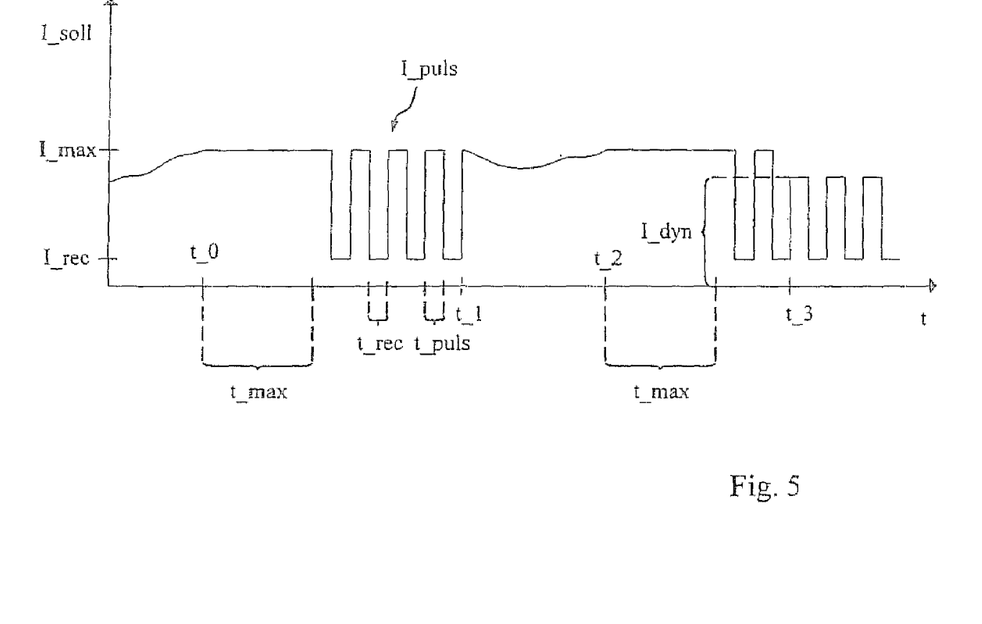
FIG. 5 shows a waveform over time of the output signal from the additional circuit.

A possible waveform for the current desired-value signal I_desired as a function of time t can be seen in FIG. 5. Initially, the additional circuit 21 is in the first mode in which the current desired-value signal I_desired corresponds to the reference signal I_f. At first, the current desired-value signal I_desired is below the maximum value I_max but as the time t goes on it rises and at time t_0 it reaches the maximum value I_max. Since the current desired-value signal I_desired then does not drop below the maximum value I_max for the preset period of time t_max, the additional circuit 21 switches over to the second mode at time t_0+t_max. The pulsed signal I_puls is now generated and is emitted as the current desired-value signal I_desired until, at t_1, the reference signal I_f again drops below the maximum value I_max. In FIG. 5 the pulsed signal is a square-wave signal. Other pulse shapes are possible however.

The signal height I_dyn of the pulses in the pulsed signal I_puls is equal to I_max in the present case. This preferably results in the current flowing through the power converter 26 corresponding to twice the rated current of the power converter during the pulses. Between the pulses, the signal height of the pulsed signal I_puls is I_rec, which is preferably sufficiently high for the current flowing through the power converter 26 during the time t_rec between the pulses to correspond to the rated current of the power converter 26 or to a lower current. The time t_rec between the pulses is equal in the present case to the pulse length t_puls, and the pulsed signal I_puls thus has a mark-to-space ratio of, preferably, 0.5. A typical value for t_puls=t_rec is for example 1s, although this value should not be construed as limiting.

At t_1, the additional circuit 21 switches back to the first mode, in which the current desired-value signal I_desired corresponds to the reference signal I_f. However, at t_2 the current desired-value signal I_desired again reaches the maximum value I_max and remains there for the time t_2+t_max, thus causing a switch to be made to the second mode and the pulsed mode to be initiated. Also, it is found at time t_3 that the temperature T of the power converter 26 has reached or exceeded the preset maximum temperature T_max, and the signal height I_dyn of the pulses in the pulsed signal I_puls is therefore reduced to a value which is less than I_max.

Figure 6:
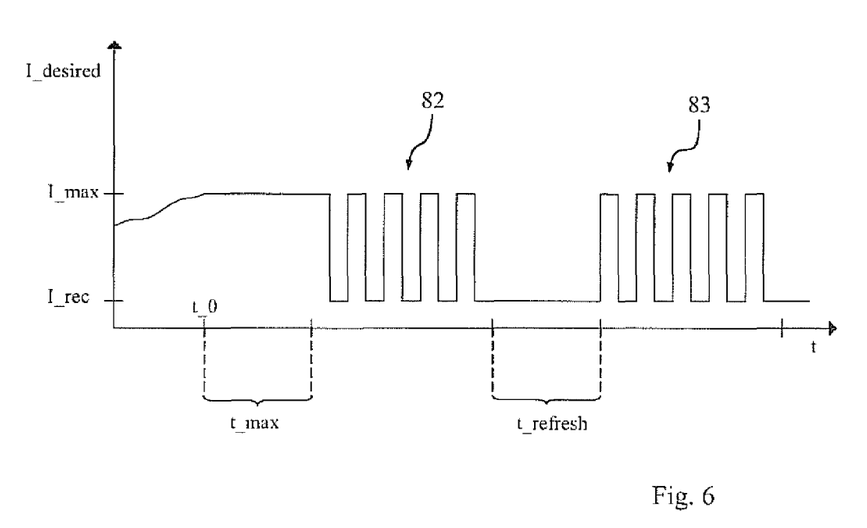
FIG. 6 shows another waveform over time of the output signal from the additional circuit.

From FIG. 6 can be seen the waveform over time of the current desired-value signal I_desired in a modification in which a group of pulses 82 comprising five pulses is first generated and emitted in the pulsed mode (second mode), starting from t_0+t_max. Following this there is a refresh period t_refresh in which no pulses are emitted. On expiry of the refresh period t_refresh, a group of pulses 83 comprising five pulses is again emitted as the current desired-value signal I_desired, after which there is again a refresh period t_refresh. This sequence is repeated for as long as the pulsed mode continues. The number of pulses in each group of pulses is not limited to five in this case but can also be set to some other figure. Also, a reduction in the signal height of the pulses is possible in this case too if the temperature T of the power converter 26 reaches or exceeds the maximum temperature T_max.

Figure 7:
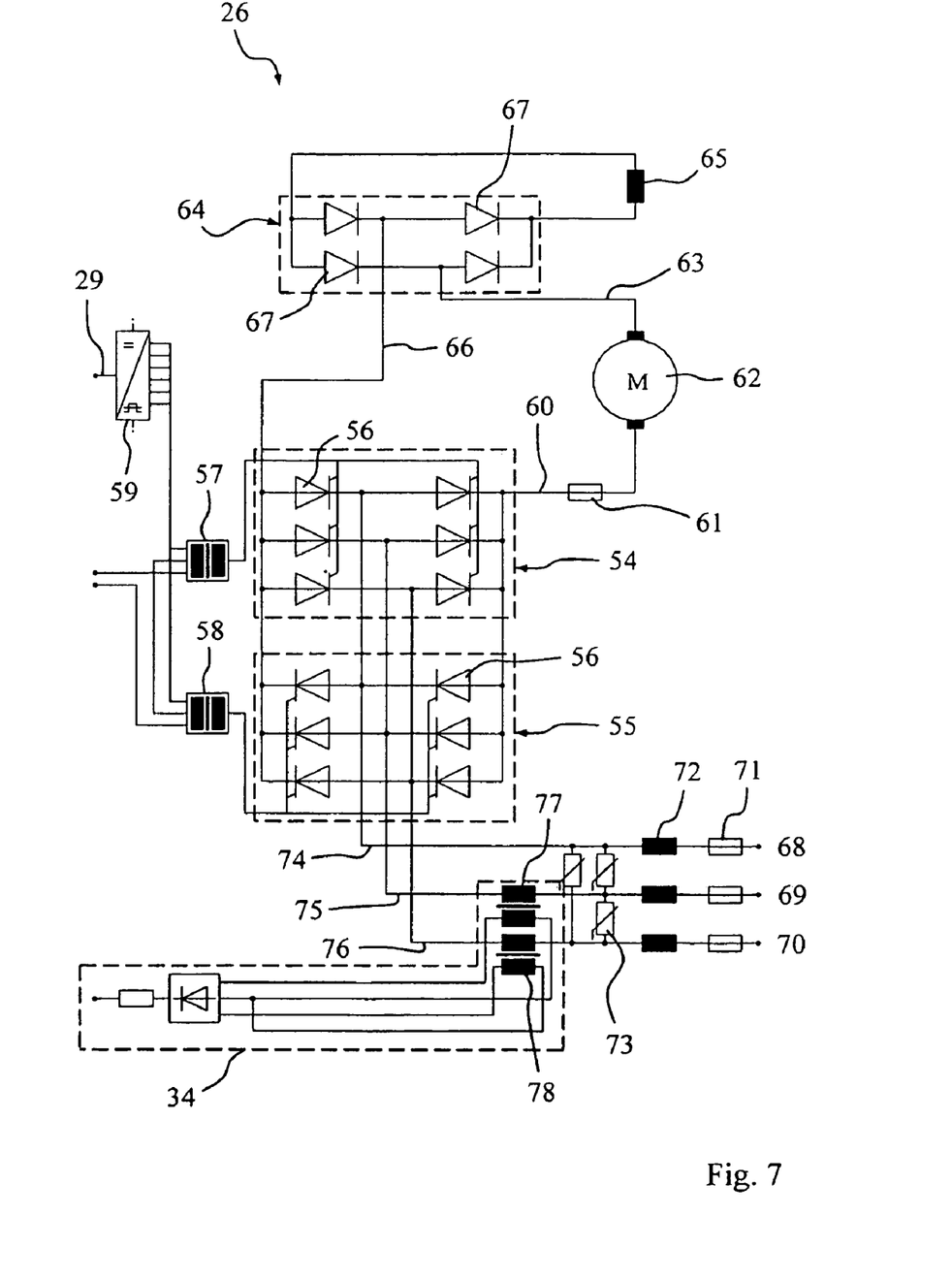
FIG. 7 is a circuit diagram of the power converter.

FIG. 7 provides a circuit diagram of the power converter 26, which has a first B6 thyristor bridge 54 and a second B6 thyristor bridge 55, the two thyristor bridges 54 and 55 being connected in parallel but being oriented in opposite directions to one another. Each of the thyristor bridges 54 and 55 has six thyristors 56, with the gate terminals of the thyristors 56 in the thyristor bridge 54 being connected to a pulse transformer 57 and the gate terminals of the thyristors 56 in the thyristor bridge 55 being connected to a pulse transformer 58. The pulse transformers 57 and 58 are connected to a phase-control module 59 to which the control signal 29 emitted by the current-correcting portion 25, which preferably represents the delay angle at the time, is fed as an input signal.

A first output line 60 from the thyristor bridges 54 and 55 is connected to one end of the rotor winding 62 of the electric motor 31 via an intervening fuse 61. Also, the other end of the rotor winding 62 is connected to one end of the stator winding 65 of the electric motor 31 by a lead 63 via an intervening diode array 64. The second output line 66 from the thyristor bridges 54 and 55 is connected to the other end of the stator winding 65 via the intervening diode array 64. The electric motor 31 is operated as a series-wound electrical machine in the present case, with the four diodes 67 of the diode array 64 ensuring that current always flows through the stator winding 65 in the same direction. It is thus possible for the current through the rotor winding 62 to be reversed without the current through the stator winding 65 reversing. A change in the direction of rotation of the rotor can be brought about in this way.

The two thyristor bridges 54 and 55 are connected by connections 68, 69 and 70 and lines 74, 75, and 76 to the three phases of a three-phase mains supply, with a series circuit comprising a fuse 71 and a reactor 72 being inserted in the line associated with each phase. Three varistors 73 are also connected between the lines 74, 75 and 76 to serve as overvoltage protection.

Inserted in the lines 75 and 76 are current transformers 77 and 78 by means of which the current flowing through the thyristor bridges 54 and 55 can be measured. The two current transformers 77 and 78 thus form the sensor part of the current-measuring means 34. The current which is measured also represents in this case the current which flows through the motor 31 and which is thus suitable to form the current actual-value signal 27.

| List of reference numerals | |
|---|---|
| 1 | Wind power generator system |
| 2 | Tower |
| 3 | Foundation |
| 4 | Ground |
| 5 | Machinery support |
| 6 | Azimuth system |
| 7 | Longitudinal axis of tower |
| 8 | Rotor |
| 9 | Rotor axis |
| 10 | Rotor hub |
| 11 | Rotor blade |
| 12 | Blade axis |
| 13 | Pitch-control drive |
| 14 | Wind |
| 15 | Electrical generator |
| 16 | System controller |
| 17 | Speed desired-value signal |
| 18 | Speed actual-value signal |

-continued

List of reference numerals

| | |
|---|---|
| 19 | Speed difference signal |
| 20 | Speed-correcting portion/current desired-value emitter |
| 21 | Additional circuit |
| 22 | Current regulator |
| 23 | (Analogue) reference signal |
| 24 | (Analogue) current desired-value signal |
| 25 | Current-correcting portion |
| 26 | Power converter |
| 27 | Current actual-value signal |
| 28 | Current difference signal |
| 29 | Control signal |
| 30 | Electric current/motor current |
| 31 | Electric motor |
| 32 | Speed of electric motor |
| 33 | Speed-measuring element |
| 34 | Current-measuring element |
| 35 | Analogue-to-digital converter |
| 36 | Digital reference signal |
| 37 | Digital processor |
| 38 | Digital current desired-value signal |
| 39 | Digital-to-analogue converter |
| 40 | Step: Set additional circuit to first mode |
| 41 | Step: Determine reference signal |
| 42 | Step: Check whether reference signal equal to or greater than maximum value |
| 43 | Step: Start timer |
| 44 | Step: Determine reference signal |
| 45 | Step: Check whether reference signal equal to or greater than maximum value |
| 46 | Step: Interrogate timer for period of time |
| 47 | Step: Check whether period of time supplied equal to or greater than maximum value |
| 48 | Step: Set additional circuit to second mode |
| 49 | Step: Determine reference signal |
| 50 | Step: Check whether reference signal equal to or greater than maximum value |
| 51 | Step: Determine temperature of power converter |
| 52 | Step: Evaluate temperature determined |
| 53 | Temperature sensor |
| 54 | B6 thyristor bridge |
| 55 | B6 thyristor bridge |
| 56 | Thyristor |
| 57 | Pulse transformer |
| 58 | Pulse transformer |
| 59 | Phase-control module |
| 60 | Line |
| 61 | Fuse |
| 62 | Rotor winding of electric motor |
| 63 | Line |
| 64 | Diode array |
| 65 | Stator winding of electric motor |
| 66 | Line |
| 67 | Diodes |
| 68 | Connection |
| 69 | Connection |
| 70 | Connection |
| 71 | Fuse |
| 72 | Reactor |
| 73 | Varistor |
| 74 | Line |
| 75 | Line |
| 76 | Line |
| 77 | Current transformer |
| 78 | Current transformer |
| 79 | (Analogue) temperature signal |
| 80 | Analogue-to-digital converter |
| 81 | Digital temperature signal |
| 82 | Group of pulses |
| 83 | Group of pulses |
| 84 | Speed regulator |
| 85 | Electric drive |

The invention claimed is:

1. An electric drive, comprising:
   at least one electric motor;
   a power converter feeding an electrical motor current to the at least one electric motor;
   a current desired-value emitter, the current desired-value emitter generating a reference signal;
   an additional circuit coupled to the current desired-value emitter so as to receive the reference signal, the additional circuit generating a current desired-value signal; and
   a current regulator coupled to the additional circuit so as to receive the current desired-value signal, the current regulator generating a control signal to the power converter so as to regulate the motor current as a function of the current desired-value signal;
   the additional circuit having a first mode wherein the current desired-value signal corresponds to the reference signal, the additional circuit having a second mode wherein the current desired-value signal is a pulsed signal.

2. An electric drive in accordance with claim 1, wherein the pulsed signal generated by the additional circuit in the second mode forms at least two groups of pulses each having successive pulses separated by intervals of time, the groups of pulses being separated from one another by an interval of time which is greater than the interval of time between successive pulses within the groups of pulses.

3. An electric drive in accordance with claim 1, further comprising:
   a temperature sensor sensing a temperature of the power converter;
   wherein the pulsed signal includes pulses with a signal height; and
   the additional circuit varying the signal height if the temperature sensed by the temperature sensor reaches or exceeds a preset maximum temperature value.

4. An electric drive in accordance with claim 1, wherein the additional circuit switches to the second mode if the magnitude of the reference signal is equal to or greater than a present maximum value for a preset period of time.

5. An electric drive in accordance with claim 4, wherein the additional circuit switches to the first mode if magnitude of the reference signal drops below a preset threshold value which is equal to or smaller than the maximum value.

6. An electric drive in accordance with claim 1, wherein:
   the current desired-value emitter comprises at least part of a speed regulator for regulating the speed of the at least one electric motor when the additional circuit is in the first mode, the reference signal generated by the current desired-value emitter corresponding to a difference between a desired speed for the at least one electric motor and an actual speed of the at least one electric motor.

7. An electric drive in accordance with claim 1, wherein the at least one electric motor comprises a D.C electrical machine and the power converter has at least one multi-phase thyristor bridge for receiving multi-phase power at an input side.

8. A wind power generator system, comprising:
   a support;
   a rotor mounted on the support for rotation about a rotor axis, the rotor having a rotor hub and at least one rotor blade connected to the rotor hub, the position of the at least one rotor blade relative to the rotor hub being adjustable;
   a pitch-control drive operable to adjust the position of the at least one rotor blade relative to the rotor hub, the pitch-control drive having an electric drive in accordance with claim 1.

9. A method for adjusting the position of at least one rotor blade of a wind power generator system using at least one electric motor that is fed an electrical motor current by a power converter, the method comprising:

generating a reference signal;

generating a current desired-value signal;

in a first mode, the current desired-value signal corresponding to the reference signal;

in a second mode, the current desired-value signal being a pulsed signal;

switching to the second mode if the magnitude of the reference signal exceeds a preset maximum value for a present period of time; and regulating the power converter as a function of the current desired-value signal.

10. A method in accordance with claim 9, further comprising:

switching back to the first mode if the magnitude of the reference signal drops below a preset threshold value which is equal to or smaller than the maximum value.

11. A method in accordance with claim 9, wherein:

the reference signal is dependent on a difference between a desired speed for the at least one electric motor and an actual speed of the at least one motor.

12. A method in accordance with claim 9, further comprising:

sensing the temperature of the power converter; and adjusting a signal height of the pulses in the pulsed signal if the sensed temperature reaches or exceeds a preset maximum value for temperature.

13. A method in accordance with claim 9, wherein:

the electric motor is a D.C. machine and the power converter has multi-phase power fed thereto.

* * * * *